United States Patent [19]
Caplin

[11] Patent Number: 5,833,175
[45] Date of Patent: Nov. 10, 1998

[54] SPACECRAFT WITH LARGE EAST-WEST DIMENSIONS

[75] Inventor: Glenn Caplin, Manhattan Beach, Calif.

[73] Assignee: Hughes Electronics Corporation, Los Angeles, Calif.

[21] Appl. No.: 577,447

[22] Filed: Dec. 22, 1995

[51] Int. Cl.[6] .................................................. B64G 1/22
[52] U.S. Cl. ...................................... 244/158 R; 244/173
[58] Field of Search ............................... 244/118.1, 120, 244/158 R, 173

[56] References Cited

U.S. PATENT DOCUMENTS

| | | | |
|---|---|---|---|
| 3,559,919 | 2/1971 | Sass | 244/173 |
| 4,306,692 | 12/1981 | Kaplan et al. | 244/173 |
| 4,988,060 | 1/1991 | Janson et al. | 244/173 |
| 5,119,225 | 6/1992 | Grant et al. | 244/158 R |
| 5,305,971 | 4/1994 | Decanini | 244/173 |
| 5,312,073 | 5/1994 | Flament et al. | 244/173 |
| 5,507,454 | 4/1996 | Dulck | 244/158 R |
| 5,634,612 | 6/1997 | Faisant | 244/173 |

*Primary Examiner*—Virna Lissi Mojica
*Attorney, Agent, or Firm*—Terje Gudmestad; M. W. Sales

[57] ABSTRACT

A spacecraft body configuration having east and west sides which are greater in length than the body's north and south sides. The east and west sides each have antennas which extend from one end of each of said east and west sides to the other end of each of said east and west sides. The north and south sides have radiators. The longer east-west side configuration may be used not only to accommodate larger east-west side antennas, but also to accommodate deployable radiators on the north and south sides.

22 Claims, 5 Drawing Sheets

SPACECRAFT WITH LARGE EAST-WEST DIMENSIONS

BACKGROUND OF THE INVENTION

In a spacecraft, such as a satellite for video data and telephonic communication purposes, a rocket fairing constrains the dimensions of the spacecraft body. The spacecraft body houses and supports communication equipment and other hardware. The traditional configuration for a spacecraft body has been either square or rectangular. The spacecraft body is generally defined by the directional position of its sides when first launched—the north-south sides being the top and bottom, respectively, and the east-west sides being the left and right sides, respectively. In rectangular configurations, where length is concerned, the north-south sides of the spacecraft have typically been favored as opposed to the east-west side. The ratio of the dimensions of the east-west side to the north-south side is known as the aspect ratio.

The efficacy of placing radiators on the north-south side of the spacecraft is a primary reason for the north-south side being favored as to the aspect ratio. Generally, it is desirable for a radiator to experience a fairly constant thermal load so that the radiator's heat rejection capability fluctuates as little as possible. This is possible when radiators are located on the north-south side because during flight, from day-to-day, there is only a very small change in position of the north-south sides with respect to the sun. Therefore, radiators mounted on the north-south sides experience very consistent thermal loading, at least so far as the sun is concerned. This is important to avoid thermal stressing of the payload and other hardware which can be caused by wide temperature variations within the spacecraft.

In contrast, the east-west sides of the spacecraft do not experience consistent thermal loading. This is because the spacecraft, from its east-west perspective, is orbited by the sun on a daily basis. Thus, within a relatively short period of time, i.e. 24 hours, the east and west sides of the spacecraft experience wider temperature variations than the north-south sides. Radiators mounted on the east-west sides, therefore, are less able to control the temperature within the spacecraft, resulting in greater thermal stressing of the payload and possibly more extreme temperatures.

The tendency to increase the aspect ratio in favor of the north-south side becomes even greater as spacecraft become more sophisticated and as spacecraft missions become more demanding. Generally, whenever more powerful communicating equipment is added, there is a need for increased heat rejection capability. Consequently, the spacecraft body is expanded along the north-south sides to accommodate larger radiators. The larger radiator surfaces also provide larger payload surface mounting area. Similarly, increases in north-south side dimensions are generally necessary to accommodate larger solar arrays whenever spacecraft power needs to be increased.

Antennas require an unobstructed view to send and receive signals, just as the radiators require an unobstructed view to reject heat into space. Consequently, they generally cannot be placed on the same side as the radiators. Antennas, therefore, are typically placed on the east-west and a nadir sides because these are the locations on the spacecraft with a clear view to earth and little or no obstruction of the field of view of the radiator.

A primary disadvantage of favoring the north-south side dimension, though, is that it inherently limits the size of the vital east-west antennas. These antennas control the satellite by receiving and sending signals to the ground station. It is desirable, and there is also increasing need, to make these antennas larger—a goal directly juxtaposed to the goal of increased radiator size. Restricting antenna size lowers antenna gain, decreases cross polarization, increases out-of-region interference and ultimately affects the overall communicating capability of a satellite. Using larger reflectors can increase antenna gain, however reflectors take up more space within the payload fairing, make deployable radiator usage difficult because of increased radiator backloading, and require more complex deployment and launch locking capabilities.

For the above-described spacecraft body configurations, as with most spacecraft structures that must fit within a payload fairing, there is a premium on maximum space utilization. This is especially so since there is an increasing need to make the north-south sides of the spacecraft larger to accommodate larger radiators at the expense of the east-west side antennas.

Accordingly, there is a need for a spacecraft body structure that better utilizes space within the payload fairing to accommodate larger east-west side antennas and increased heat rejection capability.

SUMMARY OF THE INVENTION

The apparatus and method of the present invention achieves the foregoing benefits, along with other features and advantages, by providing a spacecraft body structure where the aspect ratio favors the east-west dimensions of the spacecraft body, rather than the north-south dimensions as in the prior art. Specifically, the present invention achieves increased communication antenna size and better positioning of the payload with respect to the antennae feeds, increased heat rejection capability, increased payload mounting space, decreased solar array yoke size, and a more favorable north-south velocity component for thrusters firing through the center of mass.

The present invention achieves these and other advantages, by increasing the size of the east-west side of the spacecraft. A larger east-west side can accommodate a larger east-west side antennae, which effectively results in increased antennae gain, increased signal cross polarization, and better out-of region interference capability, all of which are desirable goals widely understood in the art.

The larger east-west side configuration also allows for more effective deployment of deployable radiators, which ultimately increases the heat rejection capability of the spacecraft. In the prior art, large reflectors on the east-west side, designed to strengthen the receiving and transmitting capability of the east-west side antennas, prohibited the use of the deployable radiators because of field of view interference with the antennas. The present invention, by allowing larger east-west sides allows the large reflectors, while leaving room for the deployment of deployable radiators clear of the field of view of the reflectors.

DETAILED DESCRIPTION OF THE INVENTION

Figure 1:
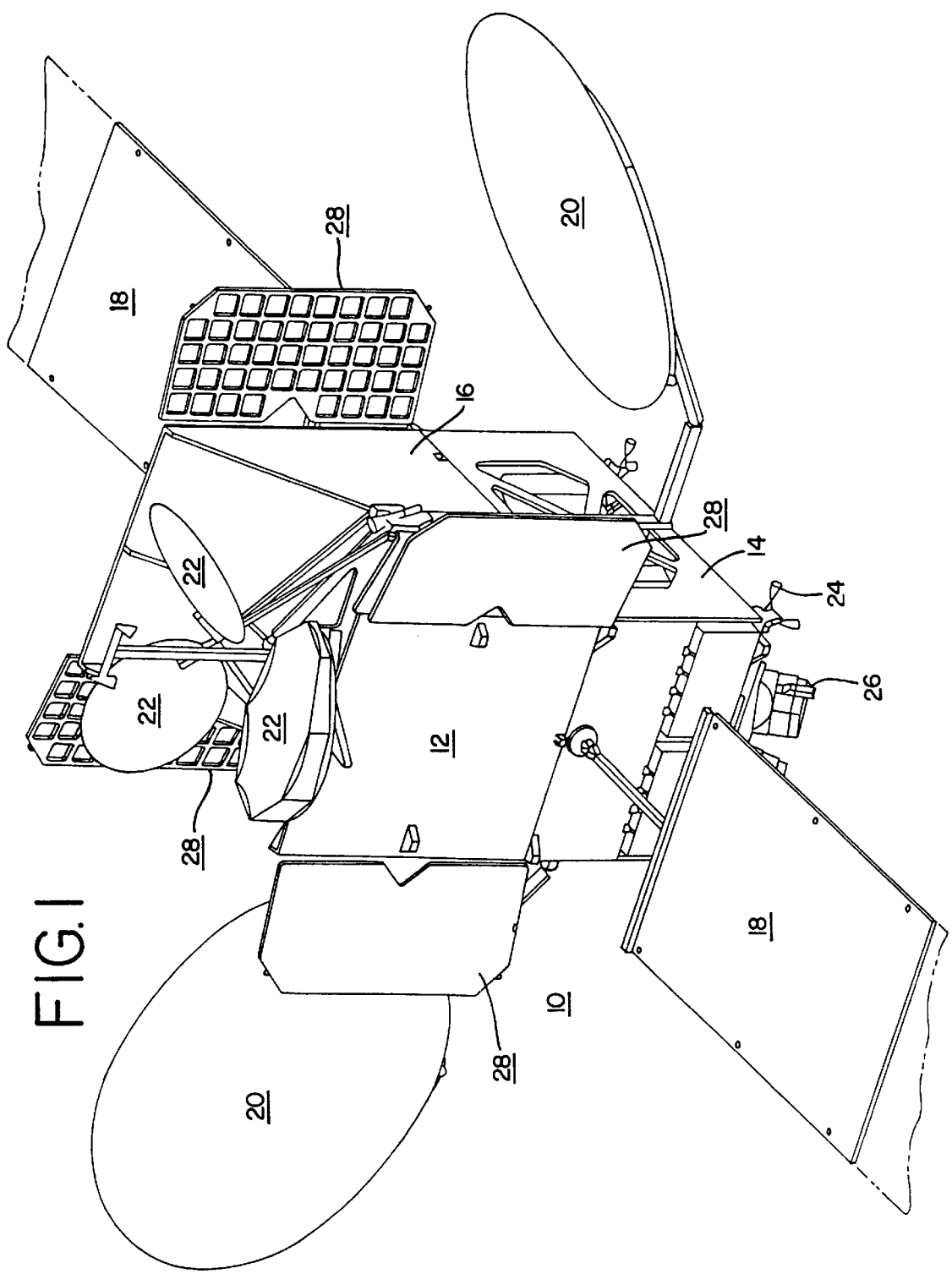
FIG. 1 is a spacecraft or satellite capable of utilizing the present invention.

A spacecraft or satellite 10 capable of utilizing the present invention is shown in FIG. 1. The satellite 10 has a spacecraft body 12 which includes a lower bus module or platform 14 and an upper payload structure 16. Deployable radiators 28 for rejecting unwanted heat from the spacecraft are shown in the deployed position, and are attached to the spacecraft body 12. Attached to the aft end of the lower bus module 14 are a plurality of engines. These engines include a centrally positioned liquid orbital thruster (not shown), four chemical propulsion engines 24 located at the corners of the bus module 14 and two pairs of xenon ion propulsion engines 26 (one pair shown). Lower bus module 14 contains fuel tanks (not shown) and various power and control modules that operate the engines and power the payload module 16. Bus module 14 further includes a pair of solar panels 18 that convert sunlight into electricity. The electricity is sent to batteries (not shown) located on the bus module 14. Bus module 14 also has a pair of antennae 20, which receive signals from an earth ground station. The antennae 20 reflect the received signals into reflectors 22, which in turn, reflect the signals into receivers (not shown). The antennae 20 are used to control the satellite 10 and to send signals to the ground station.

Payload structure 16 is attached to the bus module 14 and contains a variety of electronic equipment which may contain a number of sensors (not shown). The electronic equipment processes information gathered by the sensors and sends the processed information back to the ground station via antennae 20. The gathered information may concern for example, communications, weather observation, and navigational information.

Figure 2A:
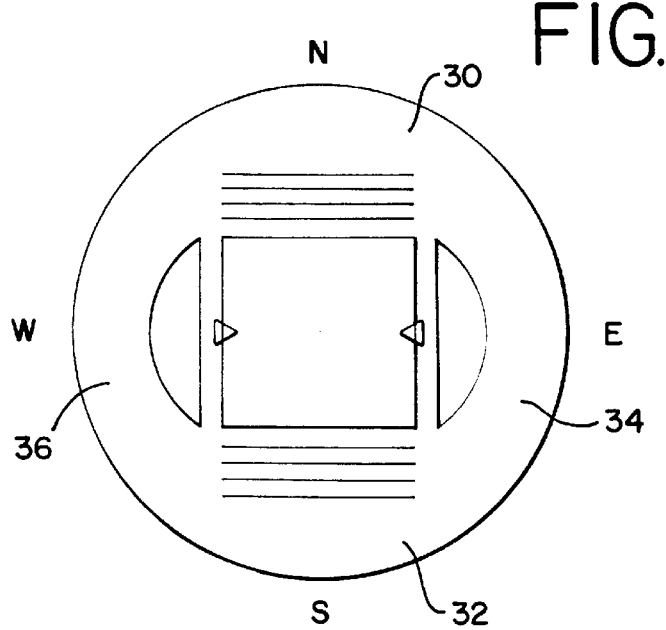
FIG. 2A is an illustration of a prior art spacecraft body configuration where the north-south sides of the spacecraft are equal with respect to length as compared with the east-west sides of the spacecraft.
Figure 2B:
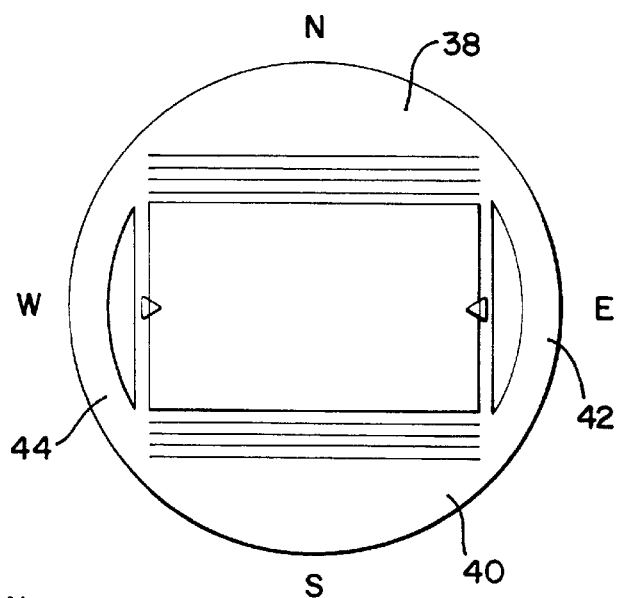
FIG. 2B is an illustration of a prior art spacecraft body configuration where the north-south sides of the spacecraft are favored with respect to length as compared with the east-west sides of the spacecraft.

Generally, in the prior art, radiators have been positioned on the north-south sides of spacecraft to maintain constant thermal loading with respect to the sun. Because increased heat rejection capability has become increasingly necessary, the prior art has accommodated increased radiator size by expanding the north-south dimensions of spacecraft bodies. FIG. 2A is an illustration of a prior art spacecraft body configuration where the north-south sides 30, 32 of the spacecraft are equal in length to the east-west sides 34, 36 of the spacecraft. FIG. 2B is an illustration of a prior art spacecraft body configuration where the north-south sides 38, 40 of the spacecraft are longer than the east-west sides 42, 44 of the spacecraft.

Expansion of the north-south sides is problematic because it inherently means that the east-west sides must be shortened for the spacecraft body and other equipment to fit within a payload or rocket fairing. Of course, if the east-west side is shortened, then also the east-west side antennas must also be decreased in size. This is highly undesirable, especially as space missions become more demanding and require antennas to transmit stronger signals into smaller regions, while avoiding radio frequency interference outside the desired region.

Figure 3:
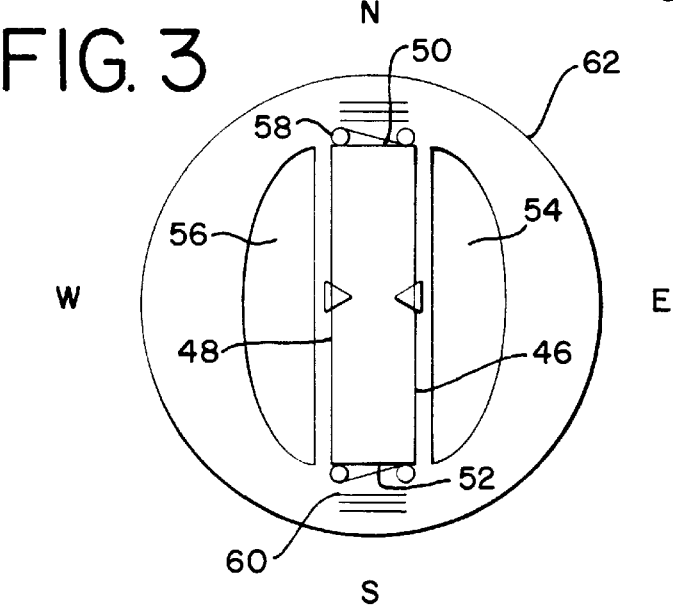
FIG. 3 is an illustration of a spacecraft body configuration according to a preferred embodiment of the invention where the east-west sides of the spacecraft are equal or favored with respect to length as compared with the north-south sides of the spacecraft.

The present invention allows both increased heat rejection capability and increased east-west antenna size by reconfiguring the spacecraft body to favor the east-west side dimensions. FIG. 3 is an illustration of a spacecraft body configuration within a payload fairing 62, from a nadir perspective, according to a preferred embodiment. FIG. 3 shows that the east-west sides 46, 48 of the spacecraft are favored with respect to length as compared with the north-south sides 50, 52 of the spacecraft. From FIG. 3 it can be seen that larger east-west antennas 54, 56 can be accommodated on the larger east-west sides 46, 48. The configuration of the present invention also allows deployable radiators 58, 60 to be implemented which allows greater heat rejection capability than the fixed north-south radiator of the prior art. Deployable radiators are not possible in the prior art without compromising east-west antenna size or interfering with large reflectors—both of which are undesirable.

Deployable radiators are ordinarily attached on the exterior of the satellite, and are stowed or folded while the satellite is in a launch vehicle. The stowed radiators are deployed at a time after launch when it is necessary to reject heat from the satellite. As heat rejection needs on spacecraft have increased, it has become increasingly difficult to meet these needs by expanding the north-south side dimensions to accommodate larger radiators. Deployable radiators, which are compact while stowed, offer a readily available solution. However, the prior art spacecraft body configurations made deployable radiator applications impractical, if not impossible, due to interference from east-west side antennas and reflectors.

Figure 4:
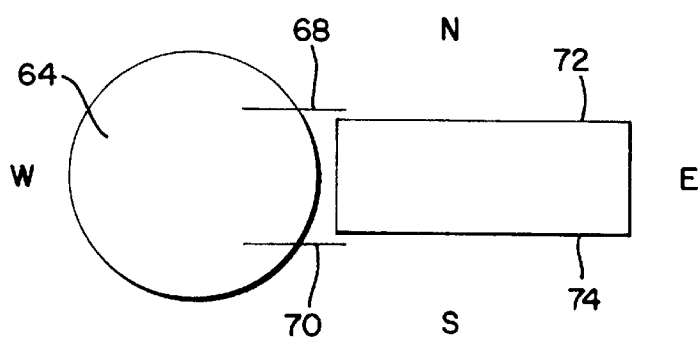
FIG. 4 is an illustration demonstrating how a large antenna would interfere with a deployable radiator's ability to deploy and, conversely, how the deployable radiator would interfere with the antennas field of view, in a prior art spacecraft body configuration where north-south side dimensions are favored.
Figure 6:
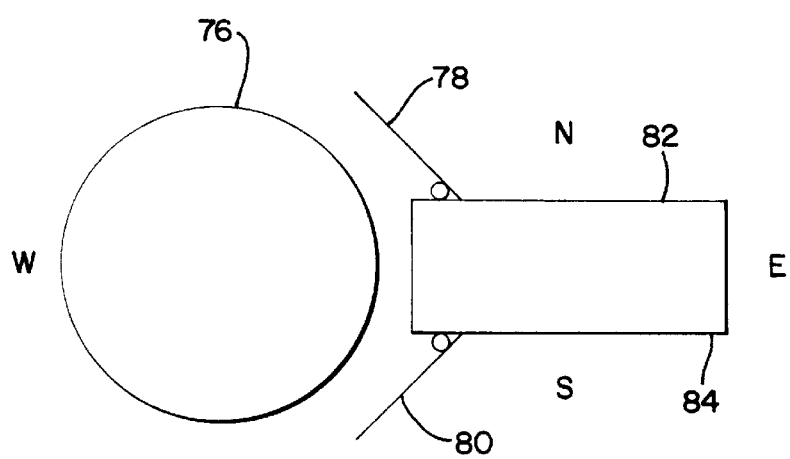
FIG. 6 is an illustration demonstrating how a large reflector would interfere with a deployable radiator's view of cold space in a prior art spacecraft body configuration where north-south side dimensions are favored.

FIG. 4 is an illustration demonstrating how a large antenna 64 would interfere with a deployable radiator's 68, 70 ability to deploy in a spacecraft body configuration where north-south side dimensions 72, 74 are favored. FIG. 6 is an illustration demonstrating how a large reflector 76 would interfere with a deployable radiator's 78, 80 view of cold space in a spacecraft body configuration where north-south side 82, 84 dimensions are favored.

Figure 5:
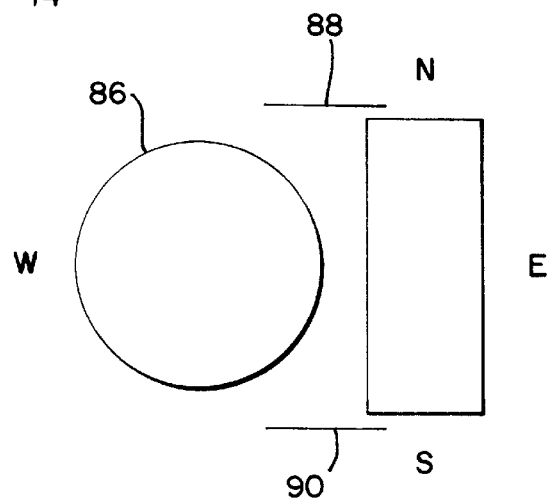
FIG. 5 is an illustration of a spacecraft body configuration according to a preferred embodiment of the present invention wherein a large antenna is implemented with a deployable radiator.
Figure 7:
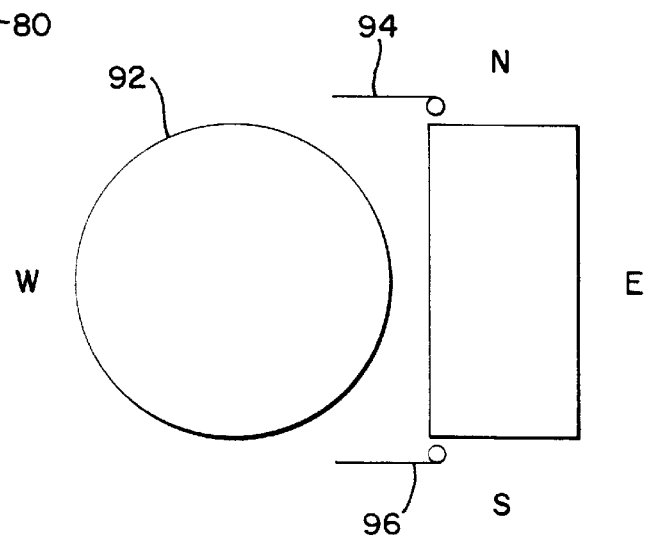
FIG. 7 is an illustration of a spacecraft body configuration according to a preferred embodiment of the present invention wherein a large reflector does not interfere with a deployable radiator's view of cold space.

The configuration of the present invention favoring the east-west side dimensions solves both the antenna and reflector positioning problems. FIG. 5 is an illustration of a spacecraft body configuration according to a preferred embodiment of the present invention wherein a large antenna 86 is implemented with a deployable radiator 88, 90. FIG. 7 is an illustration of a spacecraft body configuration according to a preferred embodiment of the present invention wherein a large reflector 92 does not interfere with a deployable radiator's 94, 96 view of cold space.

Other benefits of the present invention's spacecraft body configuration includes an increased north-south velocity component for thrusters firing through the center of mass, decreased solar array yoke size providing more space within a rocket fairing, better positioning of the antenna feeds with respect to the payload equipment resulting in lower signal transmission losses, and increased space for mounting payload equipment.

Figure 8:
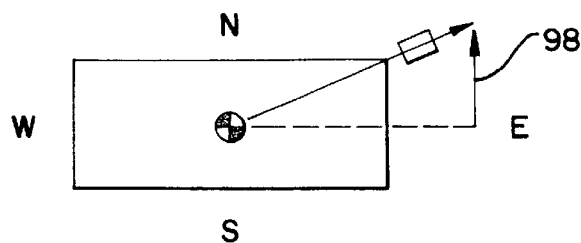
FIG. 8 is an illustration demonstrating the size of the north-south velocity component from an aft electric thruster in a prior art spacecraft body configuration where north-south side dimensions are favored.
Figure 9:
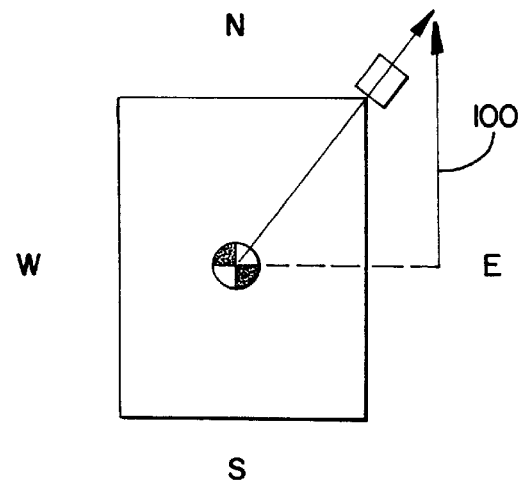
FIG. 9 is an illustration demonstrating how a larger north-south velocity component than that shown in FIG. 8 is achieved where a spacecraft body configuration according to a preferred embodiment of the present invention is implemented.

FIG. 8 is an illustration demonstrating the size of the north-south velocity component 98 from an aft electric thruster (not shown), firing through the spacecraft's center of gravity, in a prior art spacecraft body configuration where north-south side dimensions are favored. FIG. 9 is an illustration demonstrating how a larger north-south velocity component 100, than that shown in FIG. 8, is achieved where an aft force is fired through the center of gravity of the present invention's spacecraft body configuration.

Figure 10:
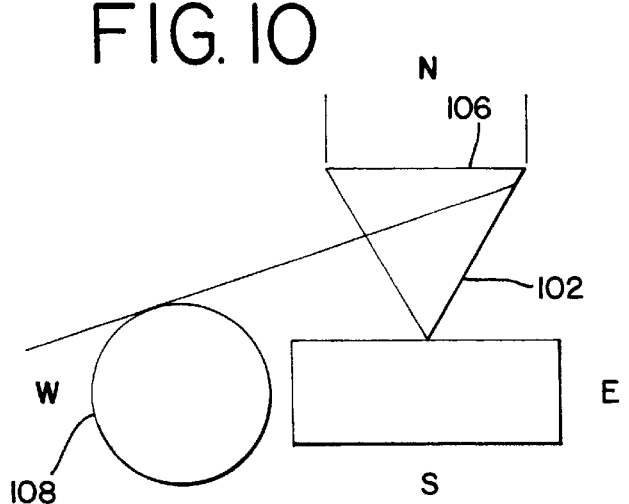
FIG. 10 is an illustration demonstrating the size of a solar array yoke in a prior art spacecraft body configuration where north-south side dimensions are favored.
Figure 11:
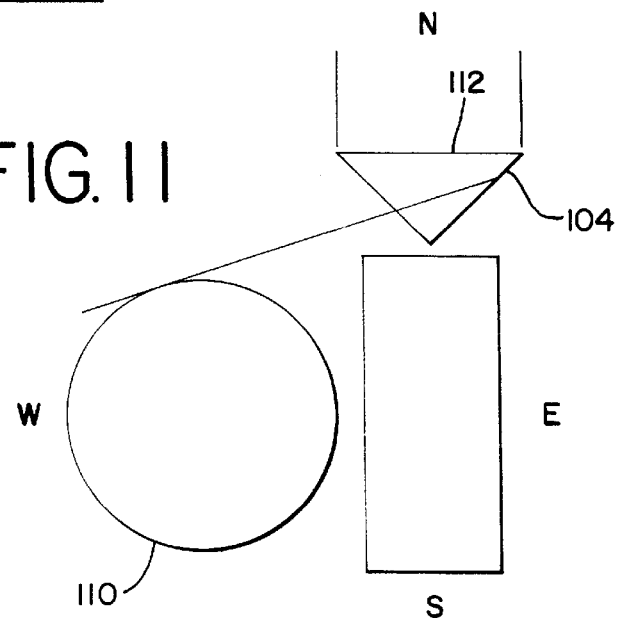
FIG. 11 is an illustration demonstrating how a smaller solar array yoke than that shown in FIG. 10 is achieved where a spacecraft body configuration according to a preferred embodiment of the present invention is implemented.

FIG. 10 is an illustration demonstrating the size of the solar array yoke 102 in a prior art spacecraft body configuration where north-south side dimensions are favored. In FIG. 10, a relatively large yoke is necessary to avoid shadowing of the solar arrays 106 by the east-west side antennas 108. FIG. 11 is an illustration demonstrating how a smaller solar array yoke 104 than that shown in FIG. 10 is achieved where a spacecraft body configuration according to a preferred embodiment of the present invention is implemented. Even where a larger east-west antenna 110 is implemented, the solar array yoke 104 of the solar array 112 of the present invention is substantially shorter, leaving more space within the payload fairing.

Figure 12:
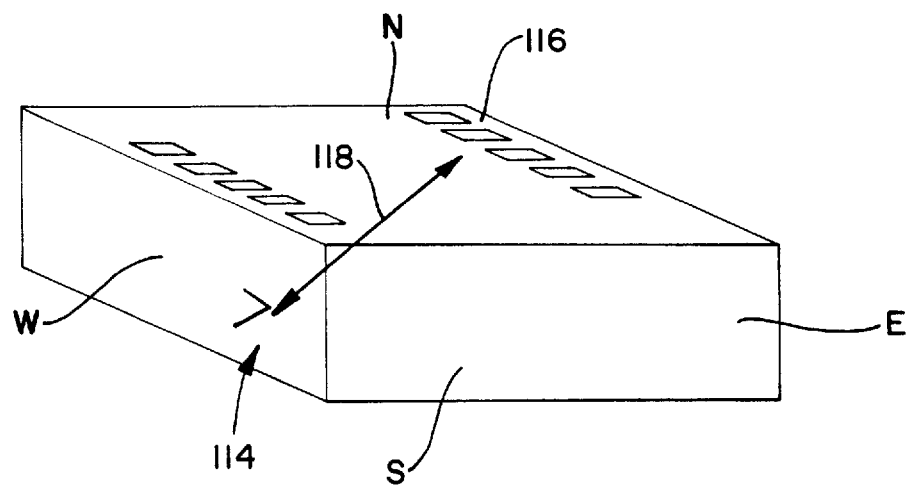
FIG. 12 is an illustration demonstrating the distance from the antenna feed to the payload equipment in a prior art spacecraft body configuration where north-south side dimensions are favored.

FIG. 12 is an illustration demonstrating the distance 118 from the antenna feed 114 to the payload equipment 116 in a prior art spacecraft body configuration where north-south side dimensions are favored. Other designs place the radiator panels closer to the center of the payload structure. This is an attempt to improve RF signal transmission by moving the communication modules closer to the satellite's antenna feeds which are located near the center of the payload structure. The result, however, is less interior space within the payload, leaving less room for antennas, propulsion systems and other equipment which are not loaded on the radiator panel side of the spacecraft.

Figure 13:
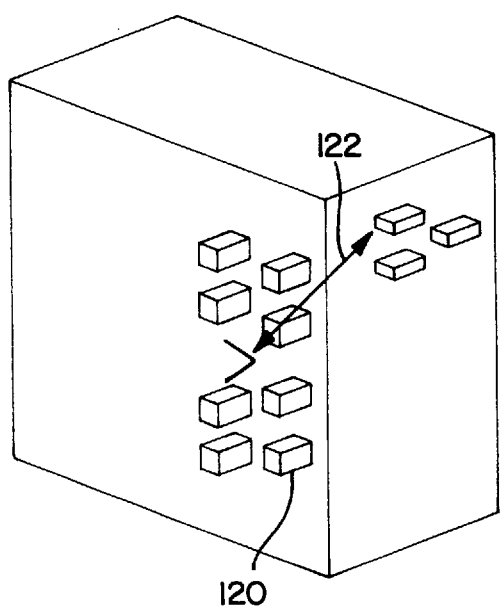
FIG. 13 is an illustration demonstrating how a shorter distance than that shown in FIG. 12 is achieved where a spacecraft body configuration according to a preferred embodiment of the present invention is implemented.

The present invention solves these problems by allowing equipment 120 to be loaded within the interior of the spacecraft body structure, substantially on the spacecraft body's east and west sides. FIG. 13 shows this and demonstrates how a shorter distance 122 than that shown in FIG. 12 is achieved where a spacecraft body configuration according to a preferred embodiment of the present invention is implemented.

FIG. 13 also illustrates the capability of the present invention to mount a greater amount of payload equipment. Payload equipment can be mounted on both sides of panels adjacent to the antenna feeds whereas the prior art of FIG. 12 allows equipment to be primarily mounted only on one side of the radiator. Consequently, a greater amount of payload equipment can be packaged in the present invention than in the prior art.

It is herein intended that the foregoing detailed description be regarded as illustrative rather than limiting, and that it be understood that it is the following claims, including all equivalents, which are intended to define the scope of the invention.

What is claimed is:

1. A spacecraft body configuration comprising:
   a north side having a first radiator;
   a south side of substantially equal length as said north side having a second radiator;
   an east side, said east side having a first antenna and said east side being greater in length than said north side and said south side; and
   a west side, said west side having a second antenna and said west side being substantially equal in length to said east side.

2. The spacecraft body configuration of claim 1, wherein said first antenna extends from one end of said east side to another end of said east side.

3. The spacecraft body configuration of claim 1, wherein said second antenna extends from one end of said west side to another end of said west side.

4. The spacecraft body configuration of claim 1, wherein said spacecraft body has payload equipment, said payload equipment being mounted substantially on said east side.

5. The spacecraft body configuration of claim 1, wherein said spacecraft body has payload equipment, said payload equipment being mounted substantially on said west side.

6. The spacecraft body configuration of claim 1, wherein said first radiator is supplemented by a deployable radiator.

7. The spacecraft body configuration of claim 1, wherein said second radiator is supplemented by a deployable radiator.

8. The spacecraft body configuration of claim 1, wherein said spacecraft body has a solar array and a solar array yoke, said solar array yoke being just long enough to prevent shadowing of said solar array by said first antenna.

9. The spacecraft body configuration of claim 1, wherein said spacecraft body has a solar array and a solar array yoke, said solar array yoke being just long enough to prevent shadowing of said solar array by said second antenna.

10. The spacecraft body configuration of claim 1, further comprising an aft force firing through said spacecraft's center of gravity, said aft force resulting in a north-south velocity component whose magnitude is related to said length of said east side.

11. The spacecraft body configuration of claim 1, further comprising an aft force firing through said spacecraft's center of gravity, said aft force resulting in a north-south velocity component whose magnitude is related to said length of said west side.

12. A method of making a spacecraft body, comprising the steps of:

providing a north side having a first radiator;

providing a south side of substantially equal length as said north side having a second radiator;

providing an east side, said east side having a first antenna and said east side being greater in length than said north side and said south side; and providing a west side, said west side having a second antenna and said west side being substantially equal in length to said east side.

13. The method of claim 12, wherein said first antenna extends from one end of said east side to another end of said east side.

14. The method of claim 12, wherein said second antenna extends from one end of said west side to another end of said west side.

15. The method of claim 12, wherein said spacecraft body has payload equipment, said payload equipment being mounted substantially on said east side.

16. The method of claim 12, wherein said spacecraft body has payload equipment, said payload equipment being mounted substantially on said west side.

17. The method of claim 12, wherein said first radiator is supplemented by a deployable radiator.

18. The method of claim 12, wherein said second radiator is supplemented by a deployable radiator.

19. The method of claim 12, wherein said spacecraft body has a solar array and a solar array yoke, said solar array yoke being just long enough to prevent shadowing of said solar array by said first antenna.

20. The method of claim 12, wherein said spacecraft body has a solar array and a solar array yoke, said solar array yoke being just long enough to prevent shadowing of said solar array by said second antenna.

21. The method of claim 12, further comprising the step of an aft force firing through said spacecraft's center of gravity, said aft force resulting in a north-south velocity component whose magnitude is related to said length of said east side.

22. The method of claim 12, further comprising the step of an aft force firing through said spacecraft's center of gravity, said aft force resulting in a north-south velocity component whose magnitude is related to said length of said west side.

* * * * *